United States Patent [19]
Fukuhori et al.

[11] Patent Number: 5,188,645
[45] Date of Patent: Feb. 23, 1993

[54] METHOD AND APPARATUS FOR DEW POINT ADJUSTMENT USING DRY DEHUMIDIFIER

[75] Inventors: Shinji Fukuhori; Naoyuki Iwasaki, both of Kanagawa, Japan

[73] Assignee: Fuji Photo Film Co., Ltd., Kanagawa, Japan

[21] Appl. No.: 709,570

[22] Filed: Jun. 3, 1991

[30] Foreign Application Priority Data

Jun. 28, 1990 [JP] Japan .................. 2-168273

[51] Int. Cl.$^5$ ............................................. B01D 53/06
[52] U.S. Cl. ........................................ 55/20; 34/80; 55/34; 55/77; 55/163; 55/390
[58] Field of Search ............. 55/20, 34, 59, 60, 62, 55/77, 78, 80, 163, 390; 34/80; 62/271

[56] References Cited
U.S. PATENT DOCUMENTS

| | | | |
|---|---|---|---|
| 3,009,540 | 11/1961 | Munters | 55/34 |
| 3,446,031 | 5/1969 | Chi et al. | 62/271 |
| 3,470,708 | 10/1969 | Weil et al. | 62/271 |
| 3,621,585 | 11/1971 | Robertson | 34/80 X |
| 3,889,742 | 6/1975 | Rush et al. | 55/390 X |
| 4,871,607 | 10/1989 | Kuma et al. | 55/390 X |

Primary Examiner—Charles Hart
Attorney, Agent, or Firm—Sughrue, Mion, Zinn, Macpeak & Seas

[57] ABSTRACT

A method and apparatus for dew point adjustment using dry dehumidifiers wherein fixed dew point adjustment of drying air can be ensured from the time immediately after the start of coating until the establishment of a steady operating state, even if dry dehumidifiers of low control response are used. As a result, air having a fixed dew point can be always sent to a drying apparatus at a low drying cost. Air received from the drying apparatus is dehumidified to a dew point below the desired steady-state dew point, and then humidified to the desired dew point. After steady-state operation is reached, the humidification is discontinued.

12 Claims, 2 Drawing Sheets

METHOD AND APPARATUS FOR DEW POINT ADJUSTMENT USING DRY DEHUMIDIFIER

BACKGROUND OF THE INVENTION

The present invention generally relates to a dew-point adjusting method and apparatus which is effective for use in an apparatus for drying photographic film, printing paper, etc., in the manufacture of photosensitive materials. More particularly, the invention relates to a dew point adjusting method and apparatus using dry dehumidifiers, in which drying air to be sent to a drying apparatus is adjusted so as to have a fixed dew point.

Adjustment apparatuses for adjusting drying air to be sent to a drying apparatus so as to have a fixed dew point can be classified into two types, one using wet dehumidifiers and the other using dry dehumidifiers. In a wet-type adjustment apparatus using wet dehumidifiers, it is possible to relatively easily generate drying air having a fixed dew point from the start of operation of the drying apparatus until the drying apparatus has reached steady-state operation in which the dew point of the air therein is constant using a method in which water is sprayed into the air. This type of apparatus is similar to an air cleaning apparatus.

On the other hand, in the case of a dry-type adjustment apparatus using dry dehumidifiers, the dry-bulb temperature and the dew point of the air in the drying apparatus sucked into the dry dehumidifiers rapidly change at the beginning of operation of the drying apparatus and cannot be stabilized before the drying apparatus has reached its steady operating state. In such an apparatus, therefore, it has been difficult to adjust the air in response to changes in the dry-bulb temperature and the dew point of the air so as to have a fixed dew point. Thus, it is difficult to supply properly adjusted air to the drying apparatus.

In order to solve this problem, a method has been used in which, as shown in FIG. 3, a humidifier 36 is provided in a duct 2 of a dehumidifier 35 for sucking circulating air from a apparatus 1. The humidifier 36 sprays water or steam so as to stabilize the dew point of the circulating air from the drying apparatus 1 before the dew point of the circulating air has stabilized. The air with its dew point so adjusted is supplied to the dehumidifier 35. The humidifier 36 is stopped after the dew point of the circulating air has become stable. Thereafter, the adjustment of the dew point is performed using only the dehumidifier 35.

In the method in which a humidifier for circulating air is provided at a suction side of a dehumidifier and in which the humidifier is stopped through predetermined control, it is difficult to accurately carry out the control operation. Accordingly, it has been almost impossible to stabilize the dew point of the circulating air, particularly when a dry dehumidifier having a slow control response is used.

In the coating and drying of a photosensitive material, changes in drying rate occur due to variations in the dew point of the drying air. These changes in drying rate are a problem from the viewpoint of quality and yield, especially in the manufacture of photosensitive materials.

Therefore, it is desired to provide drying air having a fixed dew point from the start of operation of the drying apparatus until the drying apparatus has reached its steady operating state.

SUMMARY OF THE INVENTION

An object of the present invention is to solve the foregoing problems in the prior art and to provide a dew point adjusting method and apparatus for supplying dew-point-adjusted air to a drying apparatus using dry dehumidifiers and in which it is possible to adjust the air so as to have a fixed dew point, even during the period from the start of operation of the drying apparatus until the drying apparatus has reached a stable operating state.

In order to obtain the above and other objects, the present invention provides a dew point adjusting method using dry dehumidifiers in which the dew point of drying air to be sent to a drying apparatus is adjusted, prior to the air being supplied to the drying apparatus, so as to have a fixed dew point, wherein the method is characterized in that while the drying apparatus is transiting to a stable operating state from the start of operation of the drying apparatus, the dew point of the drying air to be dehumidified by the dry dehumidifiers is adjusted to be lower than a desired steady-state supply dew point, and the adjusted drying air is thereafter humidified so that its dew point is the same as the steady-state supply dew point. The thus-adjusted air is then supplied to the drying apparatus. Further, the dew point adjustment is converted to a direct dew point adjustment using only the dry dehumidifiers when the operation of the drying state reaches steady state.

Further in accordance with the invention, a dew point adjustment apparatus is provided which uses dry dehumidifiers for adjusting drying air so as to have a fixed dew point and which supplies the adjusted drying air to a drying apparatus, wherein the apparatus is characterized in that humidifiers are provided in ducts from the dry dehumidifiers to the drying apparatus.

As used herein, the term "drying apparatus" refers, in the case of manufacturing a photosensitive material, to an apparatus including a chilling zone, a drying zone, and temperature adjusting devices for adjusting the temperature of air to be sent to those zones. Air adjusted using dry dehumidifiers so as to have a fixed dew point is sent to those temperature adjusting devices so that the air is adjusted to have an appropriate temperature for the various zones, and the respective air is blown into the chilling and drying zones. In this case, it is necessary to provide two dry dehumidifiers and two supply-side humidifiers for the cooling and drying zones, respectively.

BRIEF DESCRIPTION OF THE DRAWINGS

The present invention will be more clearly understood from the following description in conjunction with the accompanying drawings, wherein.

DESCRIPTION OF THE PREFERRED EMBODIMENTS

Figure 2:
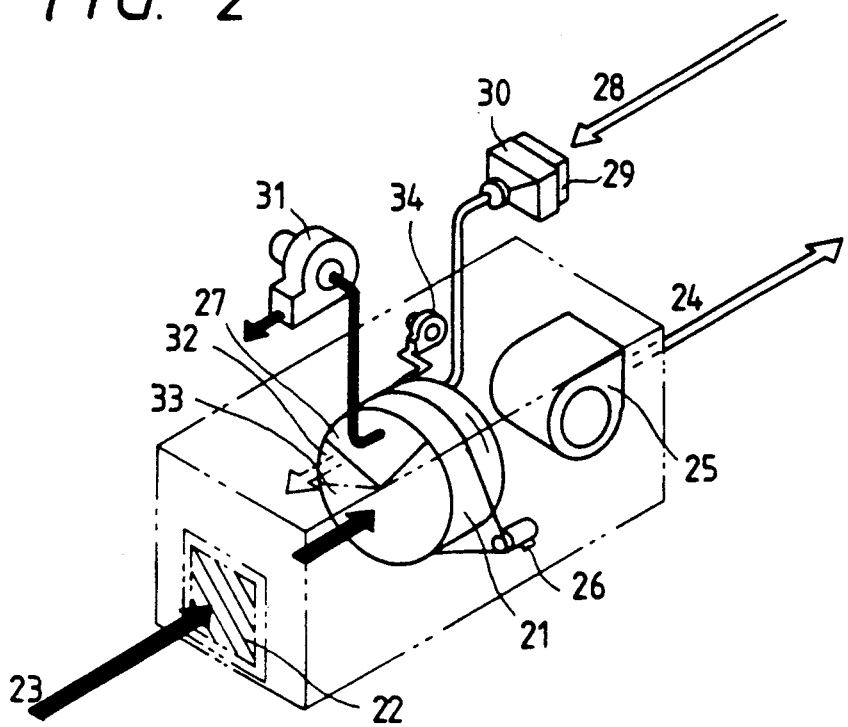
FIG. 2 is a perspective view for explaining a dry dehumidifier.
Figure 3:
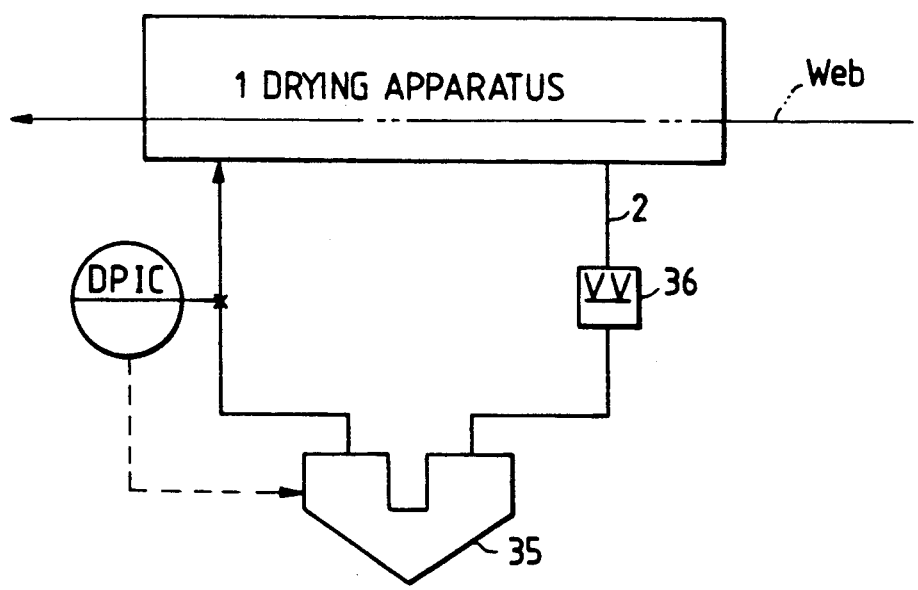
FIG. 3 is a flow diagram showing an example of a conventional dew point adjusting method using a dehumidifier.

FIG. 2 shows a dry dehumidifier according to the present invention. A dehumidifying rotor 21 is formed in such a manner that lithium chloride crystals are deposited, as a moisture absorbing agent, in micropores in an activated carbon sheet (glass wool + ceramics + activated carbon) or a silica gel sheet (ceramic + silica gel). Treatment air 23 passed through a filter 22 is sent to the dehumidifying rotor 21 so that the moisture of the air 23 is absorbed by the lithium chloride of the dehumidifying rotor 21. Then, the air is sent, as dried air 24 with its dew point lowered, to a drying apparatus by a treatment fan 25.

The dehumidifying rotor 21 is rotated by a dehumidifying rotor driving motor 26 so that the surface of the sheet of the dehumidifying rotor 21 on which the moisture in the air has been sufficiently absorbed rotates into a regenerating portion 27.

Regenerative air 28 passed through a filter 29 is sent to a regenerative air heater 30 so as to be heated to raise the temperature thereof, and then is supplied to the regenerating portion 27. The moisture absorbed in the lithium chloride in the dehumidifying rotor 21 is transferred to the regenerative air 28, and then discharged by a regenerating fan 31. Thus, the lithium chloride crystals on the surface of the dehumidifying rotor 21 are dried, thereby renewing the surface of the dehumidifying rotor 21.

Thereafter, the regenerated surface of the dehumidifying rotor 21 rotates into a purge portion 32 where the temperature of the dehumidifying rotor at the purge portion 32 is precooled by a purging fan 34, and then it rotates to a dehumidifying portion 33, which is the region where the dehumidifying rotor 21 absorbs the moisture in the air. The dehumidifying rotor 21 repeats this cycle to absorb the moisture in the air to be sent to the drying apparatus, thereby successively generating dried air having a low dew point.

In the dry dehumidifier, since the dehumidifying rotor 21 contains silica gel or activated carbon in the dehumidifying portion 33 thereof as described above, a solvent (which may have a foul smell) in the air can be absorbed in the micropores of the dehumidifying portion 33 and can be discharged into the regenerative air 28 by heated air in the regenerating portion 27.

According to the present invention, the air is dehumidified using the dry dehumidifiers so as to make its dew point lower than that of the desired steady-state dew point. For example, when air is supplied to a chilling zone of a photographic film drying apparatus under the condition that its stable dew point is $-10°$ C., the dew point of the air to be dehumidified using the dry dehumidifiers is adjusted to be lower than about $-12°$ C. Thereafter, the air is humidified to adjust the dew point of the dehumidified air to the desired dew point. For example, a dew point of about $-12°$ C. or less of the dehumidified air is adjusted to be $-10°$ C. by humidifying the air by means of the humidifiers. On the other hand, when the desired quiescent dew point of air to be supplied to the drying zone of the drying apparatus is selected to be $6°$ C., the present invention adjusts the dew point of the air using the dry dehumidifiers so as to be lower than about $4°$ C., and the dehumidified air is then humidified by the humidifiers so that the dew point of about $4°$ C. or less is adjusted to be $6°$ C.

In general, the humidifier according to the present invention can be an air cleaning apparatus using water. However, in the case of the method and apparatus according to the present invention, it is preferable to use a vapor spray for spraying vapor in view of savings in equipment space and in view of thermal economy.

Although it is difficult to adjust the dew point of air to be dehumidified when the humidity and temperature of the air vary in the case of a dry dehumidifier, it is possible to relatively easily perform dew point adjustment in the case of humidification. Therefore, according to the present invention, dehumidification is performed somewhat excessively, and then humidification is performed on the air so as to adjust the dew point to the desired steady-state supply dew point.

Figure 1:
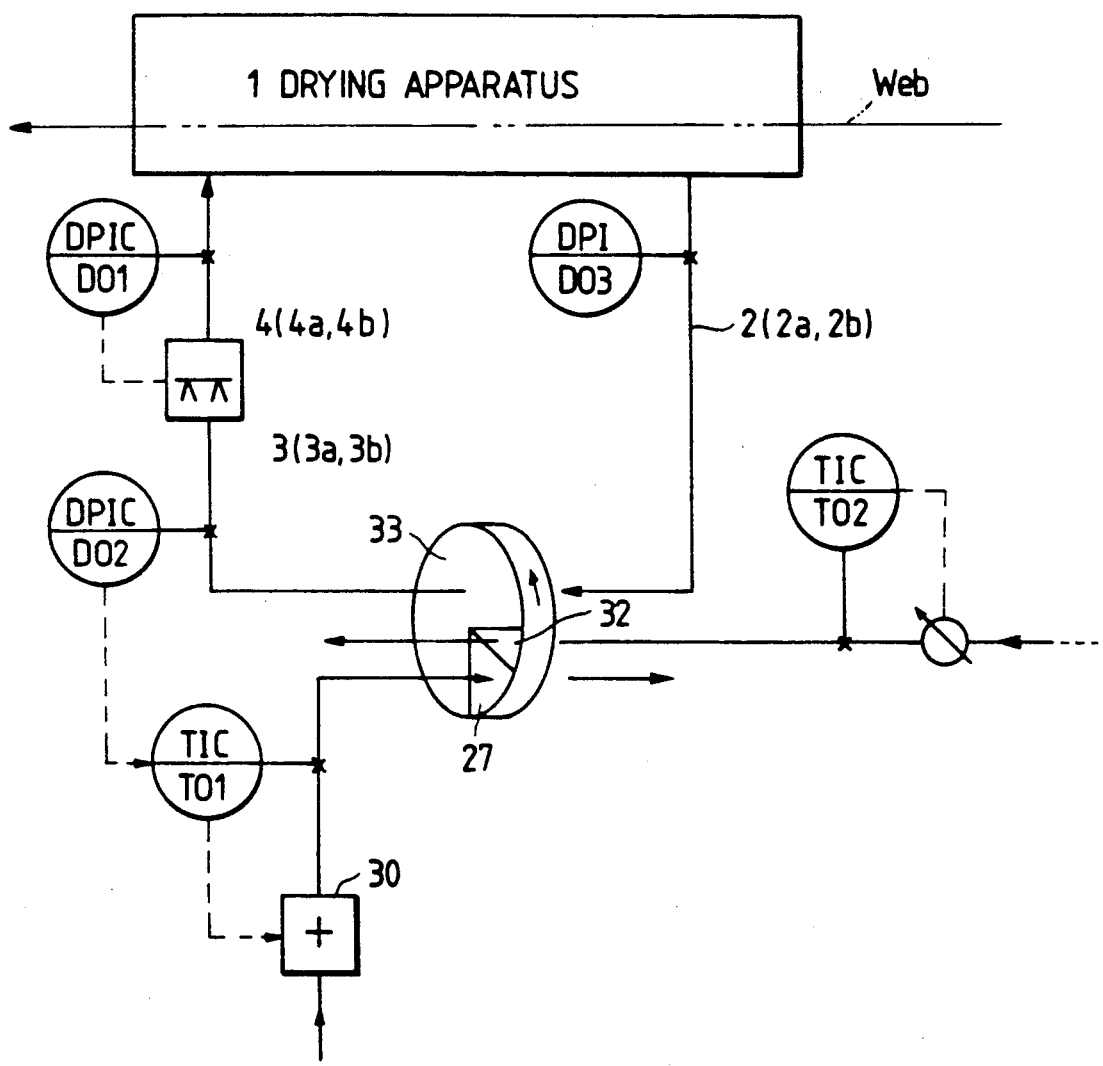
FIG. 1 is a flow diagram relating to a preferred embodiment of a method and apparatus for dew point adjustment using dry dehumidifiers according to the present invention.

A preferred embodiment of the present invention will be described with reference to FIG. 1 of the drawings. FIG. 1 is a flow diagram showing an embodiment of the inventive method and an apparatus for dew point adjustment using dry dehumidifiers according to the present invention.

Air having a fixed dew point to be sent to a drying apparatus 1 is initially sent into a dry dehumidifier 3a through a duct 2a of the drying apparatus 1 which sucks in atmospheric air. During the time period from the start of coating until a stationary state is established, to produce air for use in a chilling zone, air is sent to the drying apparatus 1 after being adjusted by the dry dehumidifier 3a to have a dew point of $-12°$ C. or less, which is lower than the steady-state supply dew point of $-10°$ C., and then adjusted using a supply-side humidifier 4a to have a dew point of $-10°$ C., which is equal to the desired steady-state supply dew point.

To produce air for use in a drying zone, on the other hand, when the stationary supply dew point temperature is selected to be, for example, $6°$ C., air is supplied to the drying apparatus 1 after being adjusted by a dry dehumidifier 3b to have a dew point temperature of $4°$ C. or less, and then adjusted using a supply-side humidifier 4b to have a dew point temperature of $6°$ C., which is the desired steady-state supply dew point temperature. When the evaporated moisture in the drying apparatus 1 has become constant, that is, when the drying apparatus 1 has reached steady state, both the supply-side humidifiers 4a and 4b are stopped and adjustment of the dew point to the desired steady-state supply dew point temperature can be performed using only the dry dehumidifiers 3a and 3b.

The operation of the adjusting method will be described in more detail below.

Before the start of coating, the temperature (T01) of regenerative air to be passed through a regenerating portion 27 of the dry dehumidifier 3 is fixed in advance to a value which is slightly higher than the desired air temperature in steady state. Since the load is low and the regenerative air temperature is high at the start of drying, the dehumidifier outlet dew point (D02) is considerably lower than the steady-state temperature, for example, it may be $-12°$ C. in the case of the chilling zone or $4°$ C. in the case of the drying zone, while the stationary supply dew point (D01) is controlled so as to be $-10°$ C. or $6°$ C. by the supply-side humidifiers 4 in the succeeding stage.

Also, after the start of coating, the temperature (T01) of the regenerative air flow to be passed through the regenerating portion 27 is fixed to a high value during a predetermined time (10-30 minutes) before the drying load reaches steady state. When a load is applied to the dry dehumidifier 3, the outlet dew point (D02) of the dry dehumidifier 3 rapidly rises by about 2°–4° C. The dehumidifying rotor 21 is, however, dried in advance by the regenerating portion 27, and the regenerative air flow temperature is kept slightly high, so that the dehumidifier outlet dew point (D02) of the dried air 24 at the outlet of a dehumidifying portion 33 will still be lower than the stationary dew point by about 0°–2° C. The dried air 24 is supplied after being adjusted by the supply-side humidifier 4 in the succeeding stage so as to make the dew point (D02) equal to the desired supply dew point temperature.

The degree of drying in the regenerating portion 27 of the dehumidifying rotor becomes stable after a predetermined time (10–30 minutes) has elapsed after the start of coating. Before this period of time, therefore, steady-state "dehumidifier outlet dew point feedback control" is not performed. In this case, if a regenerative air flow heater 30 is suddenly feedback-controlled from the dew point (D02) of the air coming from of the dry dehumidifier 3, a control delay is experienced because the rotational speed of the rotor is very slow, e.g., eight revolutions per hour. Therefore, the control operation is changed over to cascade control, i.e., (D02)→(T01)→(regenerative air heater 30), to thereby make the control quality high.

Vapor spray is used in the supply-side humidifier 4 in the system according to the present invention. With the invention, control can be performed with the quantity of vapor used being much smaller (about one-fifth) than in the conventional humidifying system for circulating air. This is because the absolute moisture content in air in a low dew point region at the dehumidifier outlet is so small that excessively dried air (D02) can be made to have a desired steady-state supply dew point (D01) by slight humidification.

In the method and apparatus for dew point adjustment using dry dehumidifiers according to the present invention, fixed dew point adjustment of drying air can be ensured from the time immediately after the start of coating until steady-state operation is reached, even if dry dehumidifiers of low control response are used. As a result, air having a fixed dew point can be always produced at a low drying cost. Accordingly, the present invention contributes to stabilizing the quality and yield of photosensitive material products.

Many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. An apparatus, comprising:
   (1) a drying apparatus for drying a web coated with photosensitive material; and
   (2) a dew point adjustment apparatus for adjusting a dew point of air for said drying apparatus, said dew point adjustment apparatus comprising:
   a supply duct for receiving air to be adjusted from said drying apparatus;
   dry dehumidifier means for drying air received by said supply duct to a dew point below a desired steady-state dew point to produce dried air;
   an output duct for sending dried air from said dry dehumidifier means to said drying apparatus; and
   humidifier means, provided in said output duct, for humidifying the dried air to a dew point equal to the desired steady-state dew point.

2. The apparatus as recited in claim 1 wherein said humidifier means no longer humidifies the dried air when said drying apparatus reaches a steady operating state when an amount of evaporation moisture becomes constant.

3. The apparatus as recited in claim 1, wherein said dry dehumidifier means comprises:
   means for supplying a flow of heated air;
   means for supplying a flow of cooling air; and
   a rotating dehumidifying rotor, said rotor passing in rotational sequence through (1) the flow of heated air, thereby to remove moisture accumulated on said rotor, (2) the flow of cooling air, thereby to cool said rotor, and (3) a path of the air received from said drying apparatus, thereby to dehumidify the air received from said drying apparatus.

4. The apparatus as recited in claim 3, wherein said rotor has a surface portion containing lithium chloride.

5. The apparatus as recited in claim 3, wherein said rotor has a surface portion containing lithium chloride crystals deposited in micropores in a sheet of activated carbon.

6. The apparatus as recited in claim 3, wherein said rotor has a surface portion containing lithium chloride crystals deposited in micropores in a sheet of silica gel.

7. A method for adjusting a dew point of air supplied to a drying apparatus, comprising the steps of:
   (1) prior to the drying apparatus reaching a steady operating state:
      (a) receiving air to be adjusted from the drying apparatus;
      (b) drying the received air to a dew point below a desired steady-state dew point to produce dried air;
      (c) humidifying the dried air to a dew point equal to the desire steady-state dew point to produce adjusted air; and
      (d) supplying the adjusted air to the drying apparatus, and
   (2) after the drying apparatus reaches said steady operating state:
      (a) receiving air to be adjusted from the drying apparatus;
      (b) drying the received air to a desired steady-state dew point; and
      (c) supplying the adjusted air to the drying apparatus.

8. A method according to claim 7, wherein
said step of drying the received air to a dew point below a desired steady-state dew point comprises:
passing a rotating dehumidifying rotor in rotational sequence through:
   (i) a flow of air that is heated relative to the received air, to remove moisture accumulated on the rotor;
   (ii) a flow of air that is cooled relative to the received air, to cool the rotor; and
   (iii) the air received from the drying apparatus, to dehumidify the received air.

9. A method according to claim 7, wherein said step of drying the received air to a desired steady-state dew point comprises:

passing a rotating dehumidifying rotor in rotational sequence through:
(i) a flow of air that is heated relative to the received air, to remove moisture accumulated on the rotor;
(ii) a flow of air that is cooled relative to the received air, to cool the rotor; and
(iii) the air received from the drying apparatus, to dehumidify the received air.

10. A method for adjusting a dew point of air supplied to a drying apparatus, comprising the steps of:
(1) receiving air to be adjusted from the drying apparatus;
(2) drying the received air to a dew point below a desired steady-state dew point to produce dried air;
(3) humidifying the dried air to a dew point equal to the desired steady-state dew point to produce adjusted air; and
(4) supplying the adjusted air to the drying apparatus.

11. An apparatus, comprising:
(1) a drying apparatus for drying a web coated with photosensitive material; and
(2) a dew point adjustment apparatus, comprising:
(a) a supply duct for receiving air to be adjusted from said drying apparatus;
(b) a dry dehumidifier for drying air received by said supply duct to a dew point below a desired steady-state dew point to produce dried air;
(c) an output duct for sending dried air from said dry dehumidifier to said drying apparatus; and
(d) a humidifier provided in said output duct for humidifying the dried air to a dew point equal to the desired steady-state dew point.

12. The apparatus according to claim 11, wherein said dry dehumidifier comprises:
(i) an air heater that supplies a flow of heated air;
(ii) an air cooler that supplies a flow of cooling air; and
(iii) a rotating dehumidifying rotor that passes in rotational sequence through the flow of heated air, through the flow of cooling air, and through a flow of the air received by said supply duct.

* * * * *